March 14, 1950

H. ABREVAYA 2,500,225

LOCATING DEVICE

Filed July 25, 1944

HARRY ABREVAYA
INVENTOR

By William D. Hall.
Attorney.

Patented Mar. 14, 1950

2,500,225

UNITED STATES PATENT OFFICE 2,500,225

LOCATING DEVICE

Harry Abrevaya, Boston, Mass.

Application July 25, 1944, Serial No. 546,462

2 Claims. (Cl. 116—135)

(Granted under the act of March 3, 1883, as amended April 30, 1928; 370 O. G. 757)

The invention described herein may be manufactured and used by or for the Government for governmental purposes, without the payment of any royalty thereon.

This invention is a device for aiding in locating desired data on an information sheet or the like.

In certain kinds of studies where it is necessary to examine and, perhaps, to copy data from cards or sheets bearing information arranged in rows or columns or both, errors are apt to occur, particularly where the material under study is somewhat repetitious and when it is crowded in arrangement.

One object of this invention is to provide a device to assist in locating desired data on an information sheet.

Another object is to provide a track disposed adjacent an information sheet and a member adapted to slide upon said track and to sweep across the information sheet in a predetermined manner.

Other objects will be apparent from the reading of the following specification and claims.

Figures 1, 2:
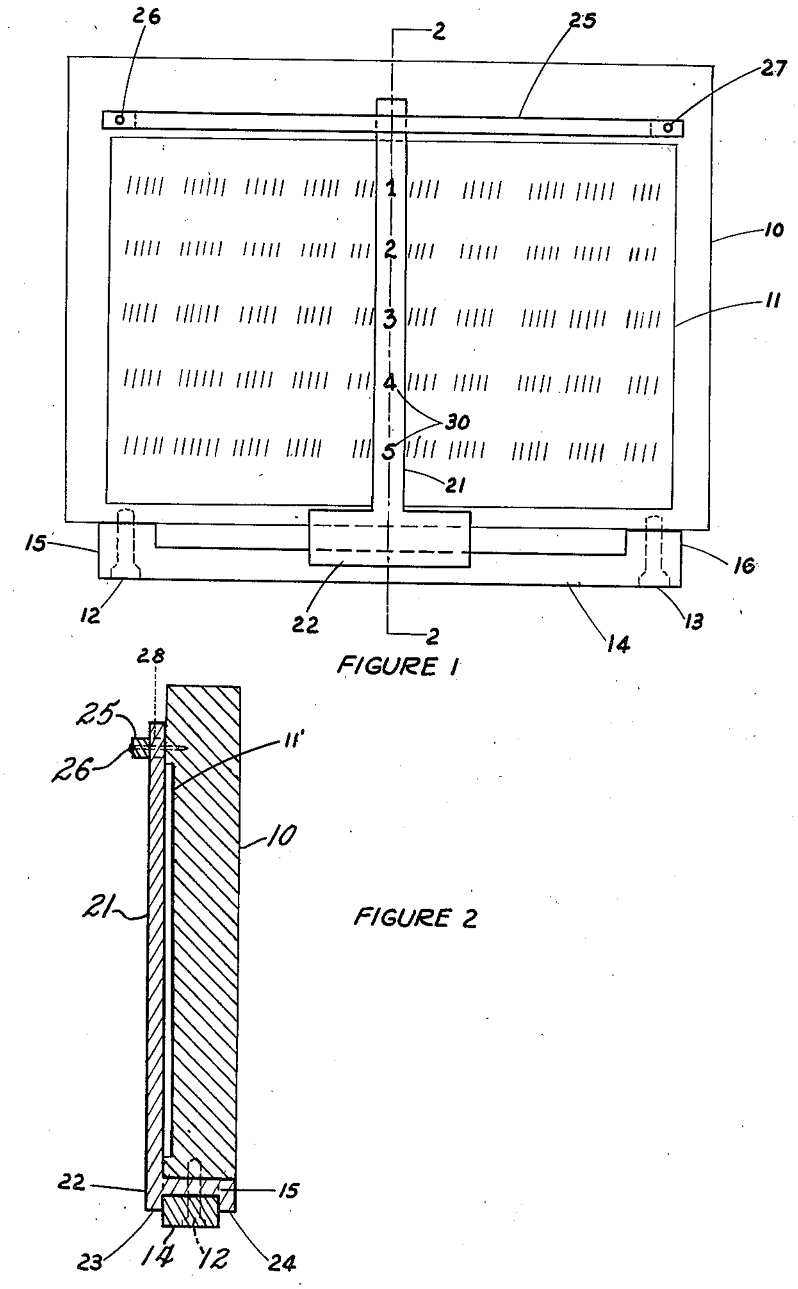
Figure 1 is a plan view of the invention, showing the same in its proper working relation to an information sheet.
Figure 2 is a section taken on a line 2—2 of Figure 1.

Referring to the drawings, and particularly to Figure 1, 10 is a holder or mounting board upon which an information sheet, 11, is mounted. A recess 11[1] is provided in the face of holder 10 and the information sheet or card fitted into this recess so that its upper surface is substantially flush with the upper surface of holder 10. Secured to the lower edge of the holder 10, as by screws 12 and 13, is a track member 14. The track proper is provided at its two ends with projections or feet, 15 and 16, through which pass the screws 12 and 13 and which produce a clearance between the holder 10 and the track proper for its entire effective length.

Adapted to slide on the track 14 is a locating device, including a member 21, adapted to be moved back and forth across information sheet 11, and a base member or slide 22. As can be seen in Figure 2, the base member is a modified H in section and provides, by means of lips 23 and 24, a channel for sliding engagement with track 14.

Just above card 11 is a guide member 25 secured to holder 10 by means of fasteners 26 and 27 which pass through projections or feet, only one of which, 28, is shown (Figure 2). These projections, of course, provide a clearance between the surface of holder 10 and the guide member.

Preferably, the member 21 is provided with indicia, as, for example, the numerals 30, to assist in locating a particular horizontal row of data on the card or sheet 11.

The above description is in specific terms, but it should be understood that the invention is not limited to the exact structure shown and described. For a true scope of the invention, reference should be had to the appended claims.

I claim:

1. A device for locating data upon an information sheet, comprising a mounting board the central portion of which is recessed to receive an information-bearing sheet and to retain the same flush with or below the surface of said board, a guide member in the nature of a track secured to an edge of said board and spaced therefrom for its effective length, a locating member including a portion for sweeping said board and a portion closely fitted for sliding movement in the space between said track and said board and partially enclosing said track and overlapping said board, and a further guide member secured to a face of said board and spaced therefrom for substantially its length said further guide member retaining the first mentioned portion of said locating member substantially in contact with said board.

2. In a device of the character described, a mounting board having the central portion of one surface thereof recessed to receive an information-bearing sheet and to hold the same flush with or below the surface of the remainder of the board, a track member secured to one edge of the mounting board in spaced relation thereto for its effective length, a locating member including an element having a flat portion slideably engaged with said one edge of said board, and a grooved portion closely engaged with said track, and another element extending across said board and an information-bearing card mounted thereon to sweep the same as the first-mentioned element is moved upon said track.

HARRY ABREVAYA.

REFERENCES CITED

The following references are of record in the file of this patent:

UNITED STATES PATENTS

| Number | Name | Date |
|---|---|---|
| 698,893 | Barry | Apr. 29, 1902 |
| 801,897 | McNamara | Oct. 17, 1905 |
| 855,217 | Ansell | May 28, 1907 |
| 1,023,432 | Long | Apr. 16, 1912 |
| 1,340,216 | Diepenbrock | May 18, 1920 |
| 1,710,555 | Tascarella | Apr. 23, 1929 |
| 2,385,347 | Chadwell | Sept. 25, 1945 |

FOREIGN PATENTS

| Number | Country | Date |
|---|---|---|
| 177,594 | Great Britain | Mar. 24, 1922 |
| 226,866 | Great Britain | Jan. 8, 1925 |
| 338,050 | France | Oct. 22, 1903 |